Figure 1:
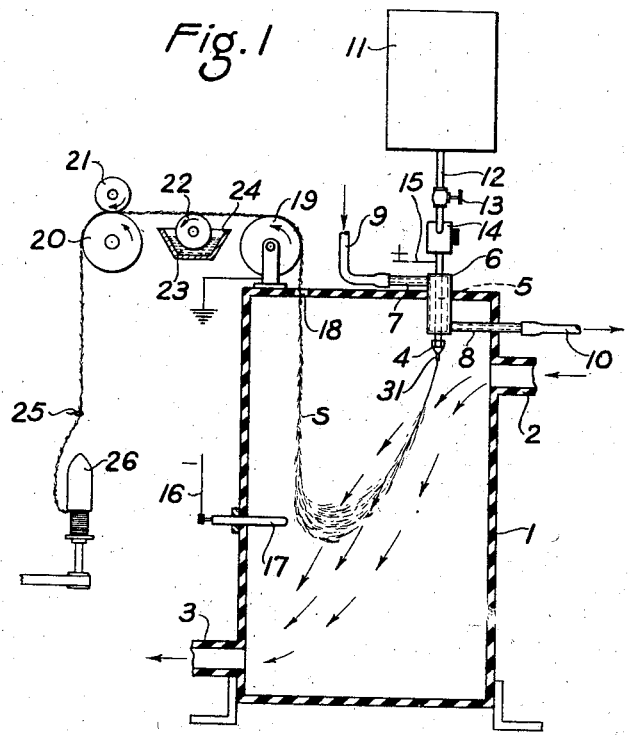

Jan. 4, 1944.     H. R. CHILDS     2,338,570
PROCESS OF ELECTROSTATIC SPINNING
Filed Oct. 30, 1941

Henry R. Childs
INVENTOR

BY
ATTORNEYS

Patented Jan. 4, 1944

2,338,570

UNITED STATES PATENT OFFICE 2,338,570

PROCESS OF ELECTROSTATIC SPINNING

Henry R. Childs, Kingsport, Tenn., assignor to Eastman Kodak Company, Rochester, N. Y., a corporation of New Jersey Application October 30, 1941, Serial No. 417,161

3 Claims. (Cl. 18—54)

This invention relates to electrostatic spinning, and more particularly to a process for the production of short lengths of fibers composed of organic derivatives of cellulose such as cellulose acetate, cellulose propionate, cellulose acetate propionate, cellulose acetate butyrate and similar cellulose derivatives by subjecting a stream of solution of the cellulose derivative material to the action of an electrostatic field.

It has long been known that solutions of various substances could be dispersed by conveying the solution into an electrostatic field of high tension, the solution thereby being separated into its component parts of solvent and solute. This method has been employed, for example, to separate salts from solutions in finely divided form. One of the most interesting applications of this method has been the production of filamentous or fibrous materials by subjecting a solution of an appropriate material such as cellulose acetate or similar cellulose derivatives to the action of an electrostatic field of high voltage. Among the early patents disclosing the broad process are the Cooley U. S. Patents 692,631 and 745,276 and the Morton Patent 705,691. The broad principle of electrostatic spinning, that is, the electrostatic disruption of solutions of cellulose derivative material to produce short lengths of yarn or staple fibers, has been more recently exploited by A. Formhals, typical examples of processes operated upon this principle being U. S. Patents 1,975,504, 2,109,333, 2,116,942 and 2,123,992. In the U. S. Patent to C. L. Norton 2,048,651, a further application of the principle of electrostatic spinning is disclosed. In fact, the closest approach to a practical manufacturing process appears to be that disclosed in Norton's U. S. Patent 2,185,417.

As will be readily understood, the practical operation of such a delicate and highly technical process is fraught with numerous difficulties, both as to apparatus and as to the steps necessary to control the process and obtain a satisfactory product. In fact, a number of what have heretofore appeared to be well-nigh insuperable obstacles present themselves. One of such obstacles is to overcome the persistent tendency of ordinary metal spinnerets to become clogged after short periods of operation thereby greatly reducing the efficiency and economy of operation. Another obstacle is the extreme difficulty experienced in collecting the fibers produced by the disrupting effect of the electrostatic field. Another serious obstacle is the difficulty involved in so coordinating the extrusion speed, temperature of the spinning solution, viscosity of the spinning solution, electrostatic potential and various other factors as to attain the desired denier and quality of fibers at a practical operating speed. As will be clearly set forth hereinafter, I have, after extensive experimentation, been successful in overcoming these obstacles and in providing a commercially satisfactory and feasible electrostatic process for the production of staple fiber yarns.

This invention has as an object to provide a practical process of manufacturing staple fibers composed of cellulose acetate and similar cellulose derivative materials by electrostatic spinning. A further object is to provide a process for electrostatic spinning of such fibers at practical operating speeds. A still further object is to provide a process of electrostatic spinning in which interruptions or increases in spinning pressure due to clogging of spinnerets are eliminated. Another object is to provide a process in which the use of streams of water, conveyor belts or other cumbersome expedients for collection of the mass of fibers is avoided. Still another object is to provide an electrostatically-produced spun yarn having the desired properties of high dry strength, high wet strength and satisfactory stretch. Other objects will appear hereinafter.

These objects are accomplished by the following invention which, in its broader aspects, comprises continually extruding a highly charged cellulose derivative solution through the orifice of a spinneret constructed of a dielectric material in a fine stream, into an electrostatic field maintained between the spinneret and a directing electrode of opposite potential, whereby the cellulose derivative material is separated from the solution in the form of short fibers or staples which are attracted to a dry, unsupported collecting tail of previously formed fibers, and the fibers drawn off as yarn. Specifically, my invention resides in a combination of conditions and factors which are coordinated in such a way as to provide a feasible and thoroughly practical method of producing staple fiber yarn in continuous strand form, which conditions and factors will be enumerated in detail below.

In the following examples and description, I have set forth several of the preferred embodiments of my invention, but they are included merely for purposes of illustration and not as a limitation thereof.

Before proceeding to a detailed description of my process and the apparatus by which it is carried out, it is desirable to refer to certain characteristics of the process and to certain properties of the desired product.

As indicated above, the process involves the extrusion of a highly charged cellulose derivative solution into an electrostatic field. In order to maintain this field and to prevent leakage of electrostatic charges, it is necessary to carefully insulate those portions of the apparatus through which the solution is fed, from the remainder of the mechanism. It should also be noted that, in general, the process involves the use of rather wide potential differences, for example, of the order of 5,000–25,000 volts.

It will also be understood that the fibrous material produced by the process is of an extremely tenuous nature and consists of short lengths of solid filamentous cellulose derivative material. These fibers may run in length from a fraction of an inch to several inches in length. Since they are formed in the air and without any support whatsoever, it will be readily understood that the collection of such fibers in a continuous manner presents an extremely difficult and delicate problem, compared to the usual cellulose acetate spinning process in which filaments of yarn are extruded from a spinneret in continuous strand form and thus easily conducted out of the spinning cabinet.

Another phase of the process of electro-static spinning which has to be taken into consideration in any practical manufacturing operation is the fact that, in general, it is possible to extrude only one filament at a time, as compared to 50 or more filaments, for example, in the usual spinning processes. In other words, it is generally necessary to use single-hole spinnerets as compared to multi-hole spinnerets customarily used in standard practice. This requires relatively high extrusion rates if practical volume is to be attained. This in turn requires a very delicate adjustment between the many rather complicated factors entering into the spinning process, such as the nature and viscosity of the spinning solution, the spinning temperature, control of filament or fiber denier and various other factors. As will be set forth in detail below, I have been successful in providing a practical electrostatic spinning process in which all of the above-mentioned major difficulties have been overcome—a process whereby a good quality spun yarn may be manufactured on a practical scale.

My invention will be more fully understood by reference to the accompanying drawing in which like numerals refer to like parts and in which, Fig. 1 is a sectional elevational view of one type of spinning cabinet and collateral apparatus which may be employed for successfully carrying out the process.

Figure 2:
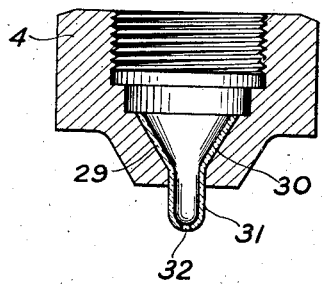

Fig. 2 is a detailed sectional view of one form of spinneret constructed in accordance with my invention.

Referring to Fig. 1, the numeral 1 designates a spinning cabinet which may be constructed in the form of a cylindrical or box-shaped cell provided near its upper end with an inlet conduit 2 for the entry of a current of warm air and at its lower end with an outlet conduit 3 for conveying the solvent-laden air therefrom. The walls of the cabinet may, as shown, be constructed of any suitable non-conducting material which will serve to electrically isolate the electrodes between which the electrostatic potential is maintained. On the other hand, if desired for purposes of economy or otherwise, the cabinet may be constructed of steel or other suitable metal, appropriate provision being made for insulating the electrodes from the cabinet structure itself. Such insulating means are not described, since they are well within the province of the person skilled in the art.

The numeral 4 designates a special type of spinneret, which will be described in detail hereinafter, this spinneret being threaded onto the lower part of candle filter 5, the candle filter and spinneret being positioned at the top of the cabinet, as shown. The candle filter is surrounded by a heating jacket 6 of conventional form, which jacket is provided with inlet conduit 7 and outlet conduit 8. Inlet conduit 7 is connected to a suitable source of heated oil by means of rubber hose connection 9. Outlet conduit 8 is similarly provided with a rubber hose connection 10 for conveying away the heat exchange fluid.

Spinning solution is supplied to the candle filter and spinneret from a supply tank 11 by means of conduit 12, control valve 13 and by gear pump 14 which conveys the spinning solution to the device at the desired constant rate.

Leads 15 and 16 are connected to a suitable source of potential (not shown) such as a Wimshurst Generator or equivalent device. Lead 15 is connected, as shown, to the metallic pipe which conducts the spinning solution from the gear pump to the spinneret 4, thus assuring that the solution emerges from the spinneret with a heavy electrostatic charge. The lead 16 is connected as shown, to a directing electrode 17, preferably positioned in a side wall of the cabinet below and on the opposite side from the spinneret 4 in such manner as to leave an appreciable space between the spinnert (which itself acts as one electrode) and the directing electrode 17.

The spinning cabinet is also provided at its top with an outlet orifice 18 to permit egress of the sliver S therefrom. The sliver on emerging from the cabinet passes over guide roll 19, thence between the pinch of rolls 20 and 21, either or both of which may be driven if desired. In progressing from roll 19 to roll 20, the sliver contacts with applicator roll 22 dipping in a bath of suitable lubricant or other treating liquid 23 contained in tank 24.

After emerging from between rolls 20 and 21, the sliver passes through guide 25 to a conventional cap spinning device 26 where it is wound and twisted under such conditions as may be demanded.

The operation of the device of Fig. 1 is as follows: Spinning solution is conducted from tank 11 through conduit 12, valve 13 and meter pump 14 to candle filter 5 and thence to spinneret 4 where it emerges therefrom in a fine, single stream. The volume of solution or dope passing to the spinneret is governed by an appropriate control of the speed of the meter pump 14. The temperature of the solution as it emerges from the spinneret may be regulated by controlling the temperature of the heat exchange fluid which flows through the candle filter jacket 6. As will be more fully explained hereinafter, it was found desirable, in accordance with my invention, to employ oil as the heat exchange fluid, in order to assure electrical isolation of the spinneret and dope stream.

The spinning solution emerging from the spinneret 4 bears a heavy charge of static electricity and, as it passes downwardly in the cabinet, is continuously disrupted or broken up in the electrostatic field between the spinneret and the opposite electrode 17 into myriads of fine, filamentous staple fibers. As the fibers are drawn out of the cabinet, the lower or depending portion thereof forms a "tail" to which the fibers undergoing formation are constantly attracted. In this manner, once the process is started by conducting the filaments up through the orifice 18 and thence over rolls 19 and 20 to the cap spinning device 26, by means of a leader to which the initially formed fibers are attracted in the cabinet, it continues to operate automatically.

The yarn may be conveniently lubricated or given any other similar treatment by means of the applicator roll 22 in contact with the sliver S which carries up lubricant or other liquid 23 to the yarn as it progresses toward the cap spinning device.

As indicated above, one of the distinguishing features of my invention is the use of a special type of spinneret. After considerable experimentation, it was found that metallic spinnerets of the conventional form were unsatisfactory. In Fig. 2, I have illustrated one form of a spinneret constructed in part of a dielectric material such as glass.

Referring to Fig. 2 of the drawing, the numeral 4 designates a spinneret adaptor which may be constructed of steel and internally threaded as shown to adapt it to be screwed to the lower end of the candle filter 5 of Fig. 1. The adaptor is also provided with a flared surface or seat 29 substantially in the form of a frustum of a cone. The spinneret itself, designated by the numeral 30, is also frusto-conical at its upper portion and is so formed and accurately ground as to fit closely on the frusto-conical seat 29. The spinneret is provided with an elongated portion 31 which projects below the lower end of the adaptor and is provided with a centrally disposed orifice 32.

The spinneret proper may be formed of any suitable non-conducting dielectric material such as glass, a heat hardening phenolformaldehyde resin such as that sold under the trade name Bakelite, or a polystyrene resin or similar material. In accordance with my invention, I have found that the spinneret should have a diameter of 0.035 to 0.15 mm. to give the best results. In fact, the orifice diameter is a rather critical factor as will be more fully pointed out hereinafter.

As an aid to understanding the considerable step forward in the electrostatic spinning art represented by the instant invention, it is necessary again to advert to certain of the numerous obstacles which have thereby been overcome. These will be referred to in separate sections and will include a tabulation of typical experimental results which illustrate the marked and outstanding improvement obtained in operation and in the quality of the product obtained.

THE SPINNING SOLUTION AND THE SPINNING ORIFICES

A solution of celulose acetate in acetone having a viscosity of 30 seconds (as measured by the so-called Dropping Ball Method employing a 1/16 inch ball, a 10-inch drop and a temperature of 20° C.) was extruded at room temperature through a .40 mm. diameter spinning orifice. The results were not satisfactory, a harsh, undesirable yarn being produced. After considerable experimentation, it was decided to employ a higher viscosity dope heated to a relatively elevated temperature and to extrude the dope through a smaller orifice. A series of runs were made in which marked improvement of the quality of the yarn was obtained by employing the conditions just stated instead of a low viscosity spinning solution, room temperature, and a large spinneret orifice. The following tabulation illustrates the marked improvement in the product obtained by operating the process in accordance with my invention.

Table No. 1

| | Test No. | | | |
|---|---|---|---|---|
| | 1 | 2 | 3 | 4 |
| Dope viscosity | 29 | 29 | 274 | 274 |
| Orifice diameter....millimeter | .4 | .4 | .13 | .06 |
| Candle filter temperature...° C | (¹) | (¹) | 95 | 44 |
| Dry G/D ² | .34 | .25 | .53 | .83 |
| Dry % S ³ | 4.8 | 2.8 | 4.3 | 12.0 |
| Wet G/D | | | .38 | .63 |
| Wet % S | | .21 | 11.5 | 23.0 |
| Hand | Harsh | 8.3 | Slightly harsh | Soft |
| | | Harsh | | |

¹ No heated candle filter used.
² Strength—grams per denier.
³ Per cent stretch (this is the elongation, stated as a per cent of the original length, which is required to break the yarn. It is equal to the length of the specimen at rupture minus the original length divided by the original length multiplied by 100).

Tests Nos. 1 and 2 were carried out under conditions accepted as satisfactory by research workers in this art and as suggested by prior disclosures, whereas Tests Nos. 3 and 4 were carried out in accordance with the instant invention. It can be readily seen from the above tabulation that a very great improvement in both the wet and dry strength of the yarn, the stretch and the hand of the finished product was obtained by employing the spinning conditions of my invention.

DIELECTRIC SPINNERET

In experimenting with the present electrostatic spinning process, extreme difficulty was encountered in operating continuously in a satisfactory manner. It was found that pressure on the spinneret built up to too high a level, the orifice gradually became clogged and extrusion was finally interrupted altogether. After many runs, it was discovered that clogging of the spinneret orifice was apparently due to some type of decomposition of cellulose acetate with resulting deposition of solid material on the inside walls or surface thereof. The spinnerets employed were of metal and it was thought that a reversal of polarity might serve to correct the difficulty. However, this was tried and proved to be a failure. A glass spinneret constructed as illustrated in Fig. 2 was then constructed and found completely to solve the difficulty. In the following tabulation, the results of a number of tests with metal spinnerets under various conditions of operation are given, together with the results of tests employing a dielectric spinneret in accordance with my invention.

Table No. 2

|  | Test No. | | | |
|---|---|---|---|---|
|  | 1 | 2 | 3 | 4 |
| Type spinneret. | Metal | Metal | Metal | Glass. |
| Novelty | Reg. oper. | Same as #1 polarity reversed. | Extruding but no charge on dope. | Reg. oper. |

| Time | Pressure, lbs. sq. in. | | | |
|---|---|---|---|---|
|  | Test 1 | Test 2 | Test 3 | Test 4 |
| Start | 470 | 445 | 410 | 325 |
| 1 hour | 515 | 560 | 450 | 315 |
| 2 hours | 535 | 565 | 460 | 315 |
| 3 hours | 580 | 580 | 460 | 325 |
| 4 hours | 590 | 600 | 460 | 320 |
| 4.5 hours | 620 | 690 | | |
| 5 hours | | | 460 | |
| 6 hours | | | | |
| 7 hours | | | | 325 |
| 8 hours | | | | |
| 9 hours | | | | 330 |
| 10 hours | | | | |
| 11 hours | | | | 350 |
| 12 hours | | | | |
| 13 hours | | | | 350 |
| 14 hours | | | | |
| 15 hours | | | | 350 |
| 20 hours | | | | |
| 22 hours | | | | 345 |
| 24 hours | | | | 330 |
| 26 hours | | | | 330 |
| 28 hours | | | | 340 |
|  | | | | 340 |

It will be seen from the above tabulation that the pressure on the spinneret, employing a metal spinneret, built up very rapidly from 470 pounds per square inch at the start (Test No. 1) to 620 pounds per square inch after 4.5 hours of operation, after which the process ceased to operate. With the polarity of the electrostatic field reversed (Test No. 2), the pressure built up in the same period of time from 445 to 690 pounds per square inch. Even when operating the apparatus under non-electrostatic conditions (Test No. 3), that is, with no charge on the dope, the pressure in the spinneret built up in approximately the same period from 410 to 460 pounds per square inch. On the other hand, when operating in accordance with my invention (Test No. 4) and employing a dielectric spinneret, the pressure built up only from 325 pounds to 340 pounds per square inch, even after the process had been operating continuously for 28 hours. This is a striking illustration of the operating advantage to be obtained by the use of a dielectric spinneret in electrostatic spinning.

COLLECTION OF THE FIBERS

One of the major problems in connection with electrostatic spinning has always been collection of the fibers. In the earlier processes, which were actually merely scientific curiosities rather than practical spinning processes, no provision was made for collecting the fibers. In later processes, attempts have been made along this line, but such efforts have always been hampered by virtual impossibility of successfully confining and discharging.

As will be readily understood, the fibers, when first produced by electrostatic disruption of the spinning solution, are extremely tenuous, light, fluffy lengths of cellulose derivative material, and tend to float off into space, or, even if confined, to cling to various parts of the apparatus, thus making continuous removal extremely difficult. Various expedients for overcoming these difficulties have been suggested in the prior art, including the use of barriers, oppositely charged conveying devices, streams of liquid and various other means. However, I have found that none of these means is satisfactory or even necessary and that, on the contrary, if the spinning conditions are properly coordinated, as herein set forth, the filaments may be collected in the form of a continuous sliver without employing streams of liquid or other awkward means. Although the use of a stream of water, as proposed by certain researchers in this field, may in many respects be advantageous, it is found that it causes a certain amount of strength loss in the fibers, especially at higher production rates. Furthermore, the use of such streams of water or other liquids makes the process cumbersome and necessitates the use of additional apparatus and much technical control. In addition to these operating disadvantages one has finally to deal with a wet product which must be treated to eliminate moisture. In my process, on the other hand, all of these cumbersome details are avoided and a dry, readily useable type of staple fiber material is produced directly and continuously.

The following table illustrates the improvement in fiber strength obtained in accordance with my process as compared to processes in which water is employed in connection with collection of the fibers.

Table No. 3

|  | Test No. | | |
|---|---|---|---|
|  | 1 | 2 | 3 |
| Amt. water | Excess | Minimum | No water |
| Dry G/D | .43 | .52 | .70 |
| Dry % S | 6.4 | 9.5 | 19.1 |
| Wet G/D | .31 | .39 | .41 |
| Wet % S | 18.0 | 23.0 | 26.5 |

As can be readily seen, there is great improvement in the yarn spun without the use of water as an auxiliary collecting means. An additional feature of the use of my so-called "dry" processes is the fact that the yarn obtained thereby is characterized by an improved lustre and a much softer hand than is the case when water is employed.

EFFECT OF FILAMENT DENIER ON YARN PROPERTIES

In general, an increase in the extrusion velocity, that is, the linear velocity of the spinning solution as it emerges from the spinning orifice, results in an increase in the denier of the filament or fiber obtained. I have found, however, that the smaller the individual filament diameter, the greater the strength of the finished yarn. In accordance with my invention, in order to obtain smaller filaments, a smaller extrusion orifice should be employed. By thus employing a smaller extrusion orifice, one can operate at higher extrusion speeds and can obtain the desired filament denier without a sacrifice, either in strength of yarn or production speed. The following table graphically illustrates the improvement in strength of the finished yarn obtained by employing small diameter spinnerets.

Table No. 4

| Sample No. | Spin. orifices | Approx. D/F | Dry G/D | Dry %S | Wet G/D | Wet %S |
|---|---|---|---|---|---|---|
| | Mm. | | | | | |
| 1 | .04 | 3–4 | .94 | 26.0 | .65 | 38.0 |
| 2 | .05 | 7–8 | .73 | 23.7 | .56 | 40.3 |
| 3 | .075 | 12–13 | .63 | 17.3 | .47 | 33.0 |

This table clearly indicates that with the smaller spinneret orifices, a stronger yarn is obtained. With use of small orifices together with a sufficiently high potential (the denier per filament goes down as the voltage is increased), extrusion speeds desirable for economically feasible operation can be obtained.

The figures given in the above table under the dry and wet strengths are of course based upon tensile strength tests on the finished spun yarn, rather than upon individual fibers.

HIGH POTENTIAL

Another factor which I have found must be taken into consideration is that of the potential existing in the electrostatic field.

A study of the above description, taken in connection with the various tables, clearly illustrates the fact that my invention resides in the coordination of a number of different factors, each of which, taken alone or in conjunction with the others, contributes to markedly improved operating conditions in the electrostatic spinning process. These factors are as follows: (1) use of a high viscosity spinning dope, (2) a relatively high spinning temperature, (3) use of small diameter spinning orifices, (4) dielectric spinneret, (5) "dry" fiber collection and (6) high potential. Of these factors, the use of a dielectric spinneret is of outstanding value. In fact, it represents the difference between success and failure, so far as any practical manufacturing operation is concerned.

While I may employ rather widely varying spinning conditions, I prefer to employ a spinning solution having a viscosity of 30–200 seconds (Dropping Ball method), an extrusion speed of about 1500 feet per minute, a spinning temperature of 40° C.–70° C. and to employ a spinneret provided with an orifice of .035 to 0.15 mm., to space the directing electrode from 12 to 24 inches from the spinneret and to employ a potential difference of 5 k. v. to 25 k. v. As to the electrical conditions prevailing in the cabinet, they are adjusted so as to provide a field having a flux density sufficient to disrupt the spinning solution as previously described and to deposit on the fibers thus formed a charge sufficient to cause them to become attached to the tail or mass of fibers being continuously withdrawn from the cabinet.

In the following examples are set forth typical procedures for carrying out my invention in the manufacture of both coreless and core types of spun yarn products.

EXAMPLE 1

The following procedure illustrates the production of a straight (coreless) spun yarn in accordance with my invention. A spinning solution is prepared by dissolving one part by weight of low propionyl cellulose acetate propionate in 4 parts by weight of acetone to provide a solution having an actual viscosity of about 75 seconds as measured by the Dropping Ball method. This solution is placed in storage tank 11 and fed by means of meter pump 14 to the jacketed candle filter 5 maintained at a temperature of 50–70° C. by hot oil circulated therethrough. The warm spinning solution is then extruded through glass spinneret 31.

The dope system is electrically isolated and charged to +10 to 15 k. v. from a suitable electrostatic generator connected to lead-in 16. The opposite side of the generator is connected to the directing electrode 17 which is charged with a −10 to 15 k. v. The dope stream is extruded at a speed of 1500 feet per minute and is shattered into innumerable fine, filamentous staple fibers by the potential difference existing between the spinneret and the directing electrode, which fibers are collected on the "tail" of the sliver S which is continuously withdrawn by the action of rolls 19 and 20. The yarn in passing between rolls 19 and 20 is lubricated by means of lubricant carried up from bath 23 by roll 22. The lubricated yarn then passes to cap spinning device 25 where it is twisted and wound.

The yarn during its travel through the cabinet is subjected to the influence of a gentle current of warm air which may have a temperature of 40° C. to 70° C. entering the cabinet through conduit 2 and leaving through conduit 3. This serves to facilitate removal of solvent from the fibers during their formation and prevents any accumulation of vapors in the cabinet.

The yarn thus produced has an average denier per filament of 5, a dry stretch of 12.5%, a wet stretch of 20%, a wet strength of .65 gram per denier and a dry strength of .90 gram per denier.

EXAMPLE 2

The following procedure illustrates the production of a core type of yarn in accordance with the above-described modification of my invention: A spinning solution of the same composition as described in Example 1 is disrupted into staple fibers under the same conditions as are employed in that example, except that a core of continuous filaments is continuously led into and through the tail of fibers undergoing formation. The core yarn may be composed of the same cellulose derivative material as the fibers undergoing formation or may be of a different type. The fibers formed in the electrostatic field are immediately attracted to the core yarn and cling thereto as the yarn is withdrawn from the cabinet to the twisting device and thus lapped and twisted around the core to form a strong villous type yarn.

While I have found it convenient to illustrate my invention by reference to spinning solutions composed of cellulose acetate, it will be evident that I may employ solutions of other cellulose derivatives, such as cellulose propionate, cellulose butyrate, cellulose acetate propionate, cellulose acetate butyrate and other single or mixed organic acid esters of cellulose. In addition to such materials, the process may be operated with solutions of various resins and similar natural and synthetic materials which are susceptible of electrostatic disruption.

It will thus be seen that I have by the present invention provided a process of electrostatic spinning which may be operated on a commercial scale and at economically feasible production rates. This represents a very real step forward in this particular field, especially since, so far as I am aware, no commercially satisfactory electrostatic process for the production of staple fibers and spun yarn products was known. My invention is particularly distinguished in the fact that it provides a relatively simple and effective means for the continuous production of spun yarn and villous core yarn at commercially feasible operating speeds.

The yarns produced in accordance with my process are useful for the manufacture of fabrics of the worsted type. In fact, yarn produced as herein described may be successfully employed in those fabrics in which wool of a quality of about 56's are customarily employed. Spun yarns of this type may be used for making fabrics having the softness of fine wool.

What I claim is:

1. In a continuous process of producing synthetic staple fibers by subjecting a solution of a synthetic fiber-forming material composed of cellulose acetate dissolved in acetone to the influence of an electro-static field of high potential, the steps of extruding the solution through the orifice of a spinneret constructed of dielectric material and having an extrusion orifice of a diameter within the range of .035 mm. to 0.15 mm., the solution being heated to a temperature of 40° C. to 70° C.

2. In a continuous process of producing synthetic staple fibers by subjecting a solution of a synthetic fiber-forming material composed of cellulose acetate dissolved in acetone to the influence of an electrostatic field of high potential, the steps of extruding the solution through the orifice of a spinneret constructed of dielectric material and having an extrusion orifice of a diameter within the range of .035 mm. to 0.15 mm., the solution having an actual viscosity of 30 to 200 seconds and being heated from 40° C. to 70° C.

3. In a continuous process of producing synthetic staple fibers by subjecting a solution of a synthetic fiber-forming material composed of cellulose acetate dissolved in acetone to the influence of an electrostatic field of high potential, the steps of extruding the solution through the orifice of a spinneret constructed of dielectric material and having an extrusion orifice of a diameter within the range of .035 mm. to 0.15 mm., the solution having an actual viscosity of 30 to 200 seconds and being heated from 40° C. to 70° C., the field into which the solution is extruded having a flux density such that the solution is disrupted and to give the fibers thus produced a charge sufficient to cause them to attach themselves to previously formed fibers being withdrawn from the process.

HENRY R. CHILDS.